Patented Oct. 8, 1935

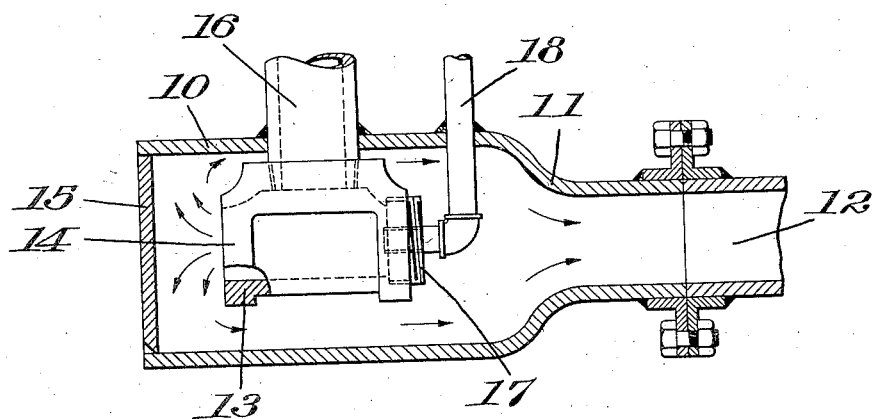

2,016,336

UNITED STATES PATENT OFFICE 2,016,336

PROCESS OF CONTACTING HYDROCARBON OIL WITH A LIQUID REAGENT

Paul W. Merchant, Texarkana, Tex.

Original application August 8, 1929, Serial No. 384,425. Divided and this application January 7, 1933, Serial No. 650,644

2 Claims. (Cl. 196—45)

This invention relates to means for effecting an intimate mixture between fluids, such for example as between hydrocarbon oils and treating reagents employed in purifying or treating the oil, and this application is a division of my copending application Ser. No. 384,425 filed August 8, 1929, which has matured into Patent No. 1,903,429, April 11, 1933.

The invention contemplates mixing the fluids in such a way that the direction of flow of the fluids is reversed so as to thus create a condition of turbulence promoting an intimate admixture of the fluids being mixed.

In a preferred embodiment of the invention the mixing device is composed of an outer and inner chamber, the fluids to be mixed being directed into the inner chamber from which they are discharged into the outer chamber against a wall thereof and the outer chamber being provided with an outlet port disposed oppositely to the wall against which the fluids are thus discharged so that in order for the fluids to reach the outlet ports their direction of flow is reversed.

In order to more fully disclose the invention, reference will now be had to the accompanying drawing showing a specific example of the invention, the drawing being a sectional elevation of an apparatus constructed in accordance with the invention and constituting an embodiment thereof.

In the specific example thus illustrated a chamber 10 is shown which may well be constructed in the form of a swaged nipple or pipe having a reduced portion 11 which is open to communicate with an outlet pipe 12. Disposed within the chamber 10 is a chamber 13 which may well be formed of an ordinary T connection, one end of which as at 14 is open to form a discharge port for directing fluid from the chamber 13 into the chamber 10 and against a wall 15 of the latter chamber. The arrangement is such that the wall 15 is disposed in an opposite direction to that of the port to the outlet pipe 12 so that the fluid directed against the wall 15 may thus be suddenly reversed in its direction of flow through the mixing chamber 10.

A pipe 16 is shown connected to one of the ports of the T 13 which extends through the walls of the swaged pipe 10. The other port is shown provided with a pipe 18 of reduced diameter.

In practicing the invention the mixing device illustrated may be employed in mixing oil with acids such as sulphuric acid and other treating or purifying agents that it may be desired to use in treating the oil. Thus the oil may be introduced through pipe 16 and the acid through the pipe 18 being preferably introduced under such pressure that the fluids are dashed against the wall 15 with the result that the direction of flow of the fluids is suddenly reversed, creating a condition of turbulence and providing an intimate admixture of the oil and acid or other reagents.

The mixed fluids may then be delivered through the pipe 12 to a coil in order to provide for further contact between the oil and acid and may then be passed to a settling chamber or the fluids may be passed directly from the pipe 12 to a suitable settling chamber.

The mixing device described herein is well adapted for use in connection with hydrogenating hydrocarbon oils and in this use of the invention the oil may be introduced to the pipe 12 and the hydrogen or hydrocarbon containing gas introduced through the pipe 18.

The invention is adapted for admixing gases with gases, or gases with liquids or liquids with liquids and under varying conditions as may be required. Thus for example the pressure on the pipes 16 and 18 may be varied. By having the pressure on the pipe 18 higher than that obtaining on the line 16 the higher pressure stream may operate to produce an injector action to draw in the liquid from the lower pressure line 16.

Obviously many modifications and variations of the invention, as hereinbefore set forth, may be made without departing from the spirit and scope thereof, and therefore, only such limitations should be imposed as are indicated in the appended claims.

I claim:

1. In the art of contacting hydrocarbon oils with liquid reagents to effect intimate admixtures thereof, the process that comprises bringing the hydrocarbon oil and reagent together in a liquid state and in streams at substantially right angles to each other so that there is commingling of the liquids, dashing the commingled liquids in a given direction against a wall, reversing the direction of flow of the liquids from the wall and continuing the passage of the liquids in this reverse direction whereby a high degree of turbulence promoting an intimate admixture of the liquids is effected.

2. In the treatment of hydrocarbon oils with a liquid reagent, the process that comprises bringing the reagent and oil together in a liquid state and in streams at substantially right angles to each other so that there is commingling of the reagent and oil, dashing the commingled reagent and oil in a given direction against a wall, reversing the direction of flow of the commingled reagent and oil from the wall and continuing the passage of the liquids in this reverse direction whereby a high degree of turbulence promoting an intimate admixture of the liquid reagent and oil is effected.

PAUL W. MERCHANT.